United States Patent
Bosetti et al.

(10) Patent No.: US 12,428,217 B2
(45) Date of Patent: Sep. 30, 2025

(54) CAPSULES FOR SOLUBLE OR EXTRACTABLE PRODUCTS

(71) Applicant: Goglio S.p.A., Milan (IT)

(72) Inventors: Osvaldo Bosetti, Milan (IT); Roberto Galbasini, Milan (IT); Giuseppe Gullo, Milan (IT); Andrea Maccagnan, Milan (IT)

(73) Assignee: GOGLIO S.p.A., Milan (IT)

( * ) Notice: Subject to any disclaimer, the term of this patent is extended or adjusted under 35 U.S.C. 154(b) by 359 days.

(21) Appl. No.: 16/767,519

(22) PCT Filed: Nov. 20, 2018

(86) PCT No.: PCT/IB2018/059132
§ 371 (c)(1),
(2) Date: May 27, 2020

(87) PCT Pub. No.: WO2019/106485
PCT Pub. Date: Jun. 6, 2019

(65) Prior Publication Data
US 2020/0377291 A1    Dec. 3, 2020

(30) Foreign Application Priority Data
Nov. 29, 2017  (IT) .................... 102017000137506

(51) Int. Cl.
*B65D 85/80* (2006.01)
*B65D 65/46* (2006.01)
*B65D 85/804* (2006.01)

(52) U.S. Cl.
CPC ....... *B65D 85/8043* (2013.01); *B65D 65/466* (2013.01)

(58) Field of Classification Search
CPC .............. B65D 85/8043; B65D 85/804; B65D 85/8046; B65D 65/466; Y02W 90/10
See application file for complete search history.

(56) References Cited

U.S. PATENT DOCUMENTS

| 2,027,137 A | 1/1936 | Yeomans |
| 4,743,556 A | 5/1988 | Ervin |

(Continued)

FOREIGN PATENT DOCUMENTS

| EP | 2631199 A1 | 8/2013 |
| EP | 2690035 A1 | 1/2014 |

(Continued)

OTHER PUBLICATIONS

International Search Report and Written Opinion in corresponding International Application No. PCT/IB2018/059132 dated Feb. 1, 2019, 13 pages.

(Continued)

*Primary Examiner* — Ericson M Lachica
(74) *Attorney, Agent, or Firm* — MH2 TECHNOLOGY LAW GROUP LLP

(57) ABSTRACT

A capsule for a soluble or extractable product, using a pressurized extraction fluid, may include: a container body defining a volume for housing the product, having a lower base, an upper base, and a side wall extending between the lower and upper bases; a first compostable barrier lid sealed to the upper base; and a second compostable barrier lid, which is a barrier against oxygen and moisture and is sealed to an inner surface of the lower base by a sealing region. The lower base may include: inner and outer surfaces; and openings for passage of the pressurized extraction fluid from the outer surface to the inner surface. The openings of the lower base may be closed by the second compostable barrier lid. The sealing region may be configured to seal the second compostable barrier lid to the inner surface until application of a predetermined fluid pressure.

20 Claims, 3 Drawing Sheets

(56) References Cited

U.S. PATENT DOCUMENTS

| | | | |
|---|---|---|---|
| 4,872,586 A | 10/1989 | Landis | |
| 5,243,164 A | 9/1993 | Erickson et al. | |
| 5,806,703 A | 9/1998 | Grandi | |
| 6,089,271 A | 7/2000 | Tani | |
| 6,663,284 B2 | 12/2003 | Buckingham et al. | |
| 6,959,832 B1* | 11/2005 | Sawada | B65D 77/30 426/115 |
| 8,434,633 B2 | 5/2013 | Beer et al. | |
| 9,657,856 B2 | 5/2017 | Buckingham | |
| 2001/0002270 A1* | 5/2001 | Perry | A21D 6/001 426/106 |
| 2002/0078831 A1* | 6/2002 | Cai | A47J 31/14 99/295 |
| 2006/0096982 A1 | 5/2006 | Gunter et al. | |
| 2008/0257165 A1 | 10/2008 | Bolzicco et al. | |
| 2009/0289073 A1 | 11/2009 | Moore et al. | |
| 2010/0180775 A1* | 7/2010 | Kollep | B65D 85/8049 426/77 |
| 2010/0237069 A1* | 9/2010 | Helou, Jr. | B65D 25/14 428/34.1 |
| 2010/0260896 A1 | 10/2010 | Yoakim et al. | |
| 2011/0033580 A1* | 2/2011 | Biesheuvel | A47J 31/0678 426/77 |
| 2011/0186450 A1 | 8/2011 | Bonacci | |
| 2011/0274794 A1 | 11/2011 | Gerbaulet et al. | |
| 2012/0097602 A1* | 4/2012 | Tedford | B65D 65/466 210/500.1 |
| 2012/0225168 A1 | 9/2012 | Kamerbeek et al. | |
| 2012/0298658 A1 | 11/2012 | Bosetti et al. | |
| 2013/0129872 A1 | 5/2013 | Krüger | |
| 2014/0037803 A1 | 2/2014 | Hansen | |
| 2014/0037916 A1 | 2/2014 | Reilly et al. | |
| 2014/0087028 A1 | 3/2014 | Orsi | |
| 2014/0161936 A1* | 6/2014 | Trombetta | B65D 85/816 426/77 |
| 2014/0272018 A1 | 9/2014 | Koller et al. | |
| 2015/0021209 A1 | 1/2015 | Rondelli | |
| 2015/0135967 A1 | 5/2015 | Hoffman et al. | |
| 2015/0166257 A1 | 6/2015 | Trombetta | |
| 2015/0201792 A1 | 7/2015 | Doglioni Majer | |
| 2015/0251847 A1 | 9/2015 | Talon | |
| 2015/0336736 A1* | 11/2015 | Cabilli | B65D 85/8043 426/112 |
| 2015/0353274 A1 | 12/2015 | Bisio | |
| 2016/0037961 A1 | 2/2016 | Digiuni | |
| 2016/0039601 A1 | 2/2016 | Doglioni Majer | |
| 2016/0075506 A1 | 3/2016 | Chapman et al. | |
| 2016/0280455 A1 | 9/2016 | Miller et al. | |
| 2016/0288988 A1 | 10/2016 | Roberts et al. | |
| 2016/0318689 A1 | 11/2016 | Rudick et al. | |
| 2016/0325862 A1 | 11/2016 | Deuber et al. | |
| 2016/0325924 A1* | 11/2016 | van der Veen | B65D 85/8043 |
| 2016/0332805 A1 | 11/2016 | Krupa et al. | |
| 2016/0362247 A1* | 12/2016 | Bartoli | B65D 85/8043 |
| 2017/0107034 A1* | 4/2017 | Okamoto | B65D 3/04 |
| 2017/0158422 A1 | 6/2017 | Andreae et al. | |
| 2017/0190451 A1 | 7/2017 | Van Der Vliet et al. | |
| 2018/0148251 A1 | 5/2018 | Kay | |
| 2018/0178972 A1 | 6/2018 | Mondillon et al. | |
| 2018/0228314 A1 | 8/2018 | Putnam | |
| 2018/0273286 A1* | 9/2018 | Dijkstra | H04W 4/50 |
| 2018/0305073 A1* | 10/2018 | Moffitt | B65D 11/02 |
| 2018/0319072 A1 | 11/2018 | Bergner | |
| 2019/0062998 A1* | 2/2019 | Chen | D21H 17/35 |
| 2019/0084757 A1* | 3/2019 | Brysch | A61K 9/0095 |
| 2019/0084759 A1 | 3/2019 | Tung et al. | |
| 2019/0150657 A1 | 5/2019 | García Ríos | |
| 2019/0177069 A1 | 6/2019 | Buckingham et al. | |
| 2019/0225411 A1* | 7/2019 | Gerbaulet | B32B 7/12 |
| 2020/0216256 A1* | 7/2020 | Miozzo | B32B 1/00 |
| 2020/0377291 A1 | 12/2020 | Bosetti et al. | |
| 2021/0039863 A1 | 2/2021 | Bosetti et al. | |
| 2021/0107731 A1 | 4/2021 | Bosetti et al. | |

FOREIGN PATENT DOCUMENTS

| | | |
|---|---|---|
| EP | 2998242 A1 | 3/2016 |
| EP | 3085642 A2 | 10/2016 |
| GB | 2538399 A1 | 11/2016 |
| GB | 2538399 A8 | 11/2016 |
| WO | 2010137952 A1 | 12/2010 |
| WO | 2013060918 A1 | 5/2013 |
| WO | 2014/012783 A2 | 1/2014 |
| WO | 2014/012783 A3 | 1/2014 |
| WO | 2014097039 A1 | 6/2014 |
| WO | 2014/118812 A1 | 8/2014 |
| WO | 2014/128315 A1 | 8/2014 |
| WO | 2015/128827 A1 | 9/2015 |
| WO | 2016/186496 A1 | 11/2016 |
| WO | 2017/098349 A1 | 6/2017 |

OTHER PUBLICATIONS

International Preliminary Report on Patentability in corresponding International Application No. PCT/IB2018/059132 dated Jul. 15, 2019, 7 pages.

International Search Report and Written Opinion in corresponding International Application No. PCT/IB2019/050270, mailed May 13, 2019, 11 pages.

International Preliminary Report on Patentability in corresponding International Application No. PCT/IB2019/050270 mailed May 26, 2020, 6 pages.

International Search Report and Written Opinion in International Application No. PCT/IB2019/052692, mailed on Jun. 5, 2019, 12 pages.

International Preliminary Report on Patentability in International Application No. PCT/IB2019/052692 dated Oct. 13, 2020, 6 pages.

\* cited by examiner

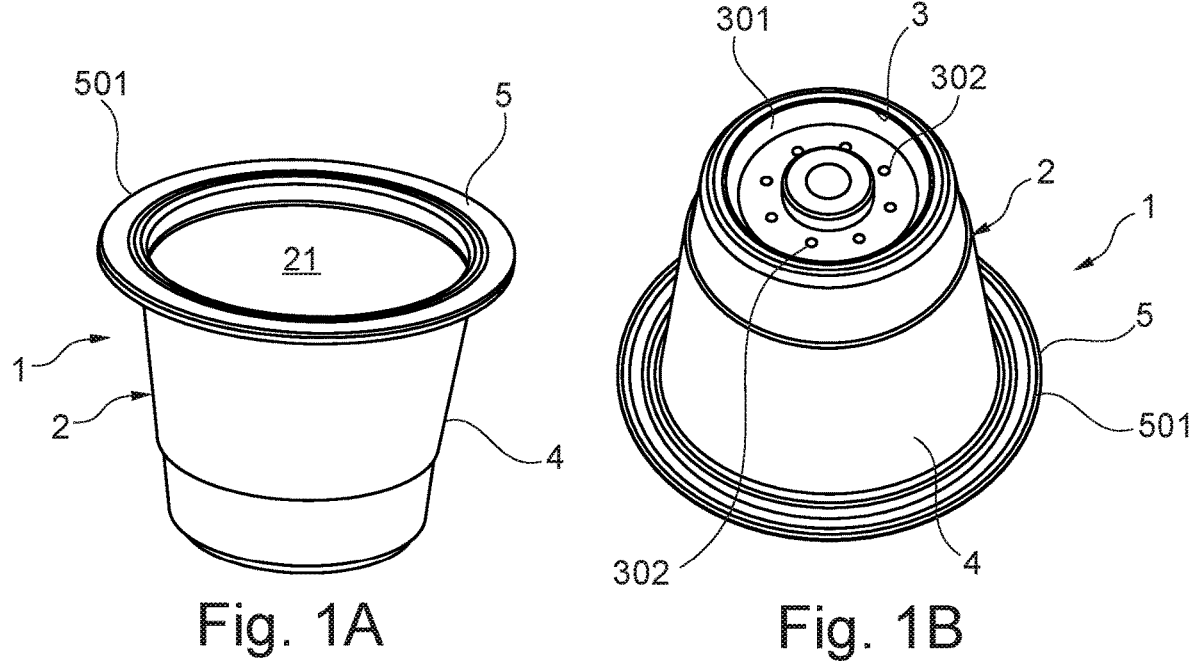
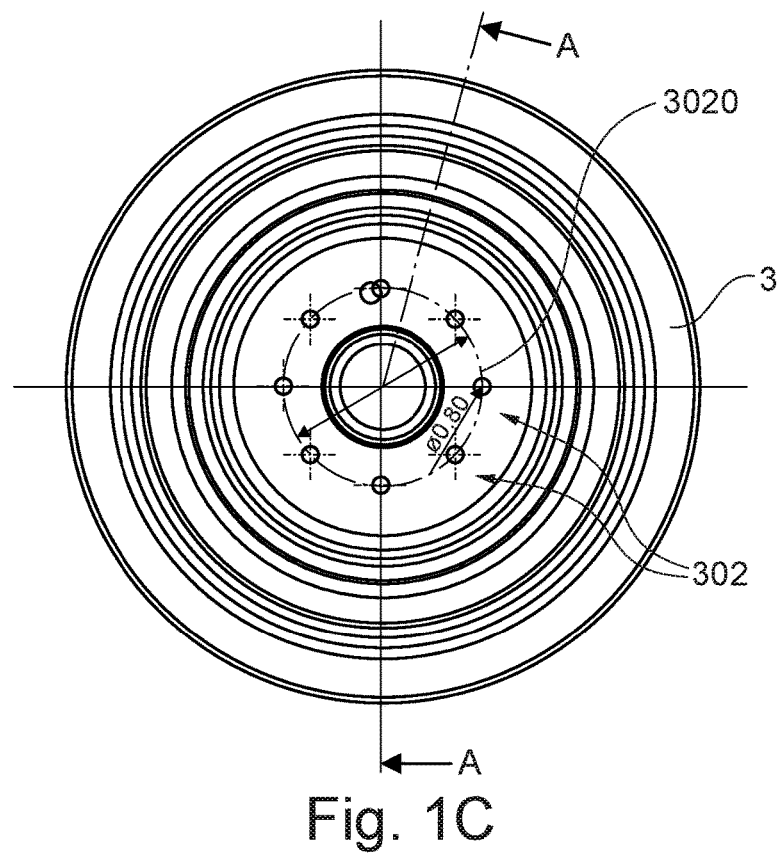

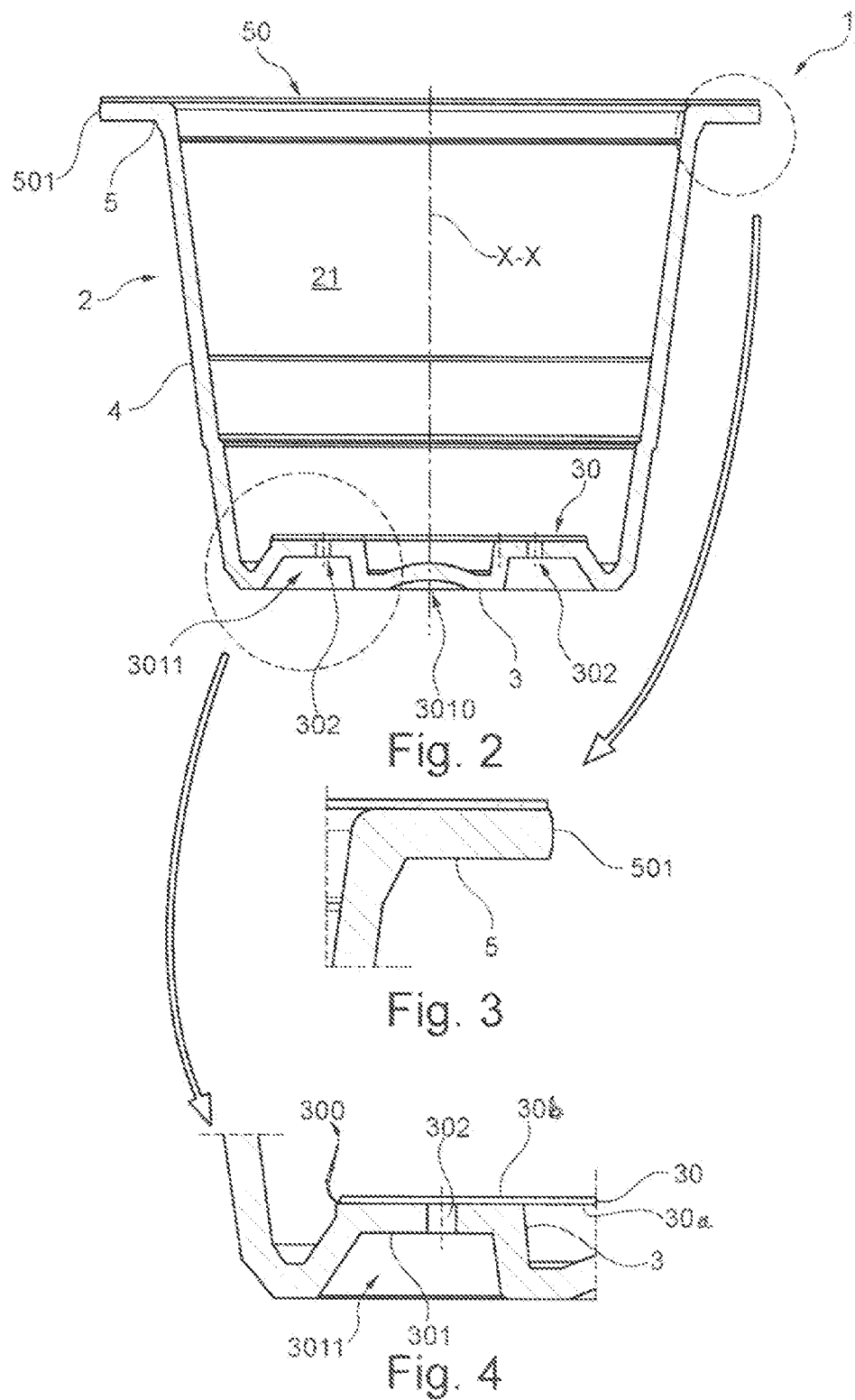

CAPSULES FOR SOLUBLE OR EXTRACTABLE PRODUCTS

CROSS-REFERENCE TO RELATED APPLICATION(S)

This application is a national stage entry from International Application No. PCT/IB2018/059132, filed on Nov. 20, 2018, in the Receiving Office ("RO/IB") of the International Bureau of the World Intellectual Property Organization ("WIPO"), and published as International Publication No. WO 2019/106485 A1 on Jun. 6, 2019; International Application No. PCT/IB2018/059132 claims priority from Italian Patent Application No. 102017000137506, filed on Nov. 29, 2017, in the Italian Patent and Trademark Office ("IPTO"), the entire contents of all of which are incorporated herein by reference.

FIELD OF THE INVENTION

The present invention relates to a capsule for preparing liquid products (e.g., soluble or extractable products).

Namely, the present invention relates to compostable capsules (also known as "cartridges") for preparing a liquid product, a beverage, by introducing extraction liquid (possibly under pressure or at high temperature) and/or steam into the capsule with the closing lids of the capsule are realized to be compostable and barrier.

BACKGROUND OF THE INVENTION

Composting is an organic waste recycling process that is used to obtain a natural fertilizer, known as compost, comprising biodegradable organic materials that may be classified as wet matter (waste from fruit and vegetables, coffee grounds and tea filters, molded bread, eggshells and bones, grass clippings) and dry matter (dry leaves, sawdust, straw, small branches, wood shavings and bark, common paper and paper towel, cardboard).

According to the standard EN 13421, waste can be deemed to be compostable if it meets the following requirements: a) at least 90% biodegradability to be reached in no more than 6 months; b) disintegrability, e.g. fragmentation and loss of visibility in the final compost. The fraction of the residues of test material with dimensions higher than 2 mm must be less than 10% of the initial mass; c) low levels of heavy metals and absence of negative effects on compost quality; d) stability of pH value, saline content, volatile solids, N. P. Mg, K.

It will be appreciated that a biodegradable material is not necessarily compostable because composting also requires desintegration disintegration thereof. On the other hand, a material that, during a composting cycle, breaks into such microscopic pieces that it cannot be entirely biodegradable is not compostable.

UNI EN 13432 is a harmonized standard that has been published in the Official Journal of the European Communities, and transposed into the individual European countries, and confers a presumption of conformity to the European Directive 94/62 EC on packaging and packaging waste.

Increasing consumer awareness of waste disposal issues led a number of industries to look for new materials for manufacturing consumables, to meet sustainability requirements of the market.

Manufacturers of single-serve capsules, mentioned above, are among the first to have moved in this direction, and have been developing sustainable solutions.

The following types of capsules are currently available:
a) rigid or semi-rigid capsules, comprising a container element made of a rigid or flexible non-compostable material (such as aluminum), and a closure element (also known as lid or membrane), made of aluminum. The two elements are heat-sealed to each other to form a containing cavity in which the extractable or soluble product is held. The cavity has oxygen and water barrier properties. These cartridges must be pierced on opposite sides for the extraction or solubilizing liquid to enter the cavity and flow out for beverage dispensing;
b) filter paper cartridges, which both comprise a container body and a closure element made of filter paper or similar materials having no barrier properties. These cartridges provide no resistance to oxygen and water. This second cartridge design requires the cartridge to be packaged in a barrier enclosure, e.g. made of aluminum, for preserving the organoleptic properties of the product, which requires the use of manufacturing systems having higher power consumption and costs;
c) rigid or semi-rigid cartridges, comprising a container element made of a rigid or flexible compostable material, and a closure element (also known as lid or membrane) made of filter paper. These cartridges provide no resistance to oxygen and water. This third cartridge design requires the cartridge to be packaged in a barrier enclosure, e.g. made of aluminum, for preserving the organoleptic properties of the product, which requires the use of manufacturing systems having higher power consumption and costs.

Prior Art Problem

Therefore, the aforementioned prior art cartridges comprise materials that do not meet compostability requirements, i.e. the aluminum that is used to form the closure element or the barrier enclosure in which the filter paper cartridge is packaged.

It was also found that existing "bio" or compostable materials in use with coffee machines having perforating tips, may exhibit a high elongation at break behavior, which affects perforation effectiveness, because the material wraps the perforating tips as a sock instead of being torn, thereby possibly causing dispensing problems. This may also entail the risk that the tips may be broken as a result of repeated cycles of this type.

WO 2010/137952 A1 discloses a cartridge or capsule configured to operate in a machine (originally designed to operate with a capsule of different type) having tips for tearing the cartridge as the unit is mechanically closed, for water to flow into the cartridge through the tears so formed. The capsule of WO 2010/137952 A1 is configured to avoid interaction with the perforating tips of the machine, as such tips do not touch the bottom of the capsule.

Object of the Present Invention

The present invention has the object of providing a compostable capsule that also has oxygen barrier properties, thereby being able to preserve the organoleptic properties of the soluble or extractable product during transportation and storage, while ensuring compliance with biodegradability and/or biocompostabilty requirements.

This object is fulfilled by a capsule for soluble or extractable products using a pressurized extraction fluid, as defined in the annexed claims.

The various embodiments of the present invention can provide a capsule (also known as cartridge or pod) that can afford, separately or in combination, one or more of the following advantages:

the possibility of forming the body of the capsule, the lower and upper lids (or sealing foils) and/or the cartridge as a whole with a compostable oxygen-barrier material without causing the aforementioned functional drawbacks.

the possibility of using machines with piercing tips originally designed to pierce the bottom wall of the capsule, with the tips not piercing the bottom wall but supporting it during extraction of the liquid product, thus avoiding the wear of these tips.

The various embodiments of the present invention can provide a biodegradable/compostable capsule having barrier properties that can operate in existing machines having piercing (and possibly filtering) tips, letting the tips interact with the bottom of the capsule without piercing it.

In the various embodiments of present invention the lower lid of the capsule may be placed within the volume defined by the body of the capsule, such lid ensuring proper dispensing of the beverage, such as pressure coffee, without being damaged, cut and/or torn, thereby avoiding any undesired release of coffee powder into the consumption container (cup) with the beverage, which would result in a negative user perception.

DESCRIPTION OF THE FIGURES

FIGS. 1A, 1B and 1C show an embodiment of the capsule of the present invention without the upper lid in a top perspective view, a bottom perspective view and a bottom view respectively;

FIG. 2 is a cross sectional view of the capsule as taken across the line A-A of FIG. 1C;

FIGS. 3 and 4 show a view of a detail of the upper portion and lower portion of the capsule as shown in FIG. 2, respectively.

DETAILED DESCRIPTION

Figure 5A:
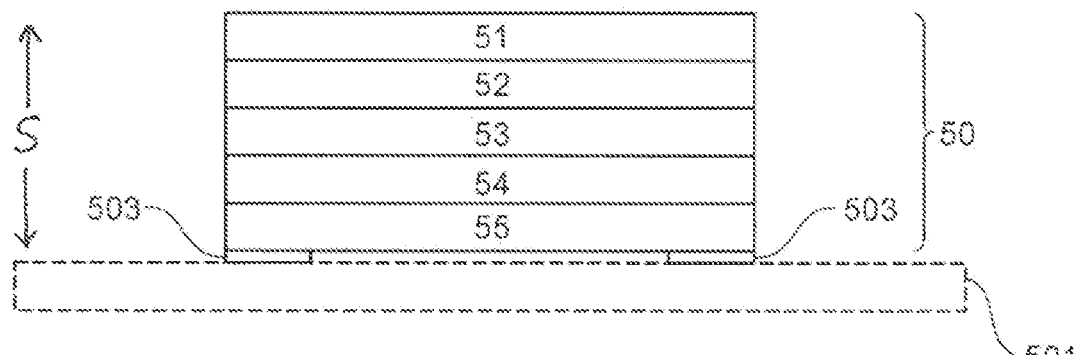
FIGS. 5A and 5B show schematic views of the upper and lower lids associated with the capsule, respectively, according to the present invention.

Even when this is not expressly stated, the individual features as described with reference to the particular embodiments shall be intended as auxiliary to and/or interchangeable with other features described with reference to other exemplary embodiments.

The structure and advantages of a capsule 1 (also known as cartridge or pod, these words being used herein as equivalents) for preparing soluble or extractable products using pressurized extraction fluid, will be described below.

In various embodiments, such liquid product may consist of a beverage such as coffee (e.g., espresso coffee) obtained by introducing liquid and/or steam under pressure and at a given temperature (i.e., high temperature) into the cartridge.

In various embodiments, the capsule 1 may contain a soluble or extractable product of a material (not shown) that can provide the liquid product using said liquid and/or steam. Such soluble or extractable product of a material may consist of coffee grounds, or another precursor of a liquid product, e.g. a beverage like tea, chocolate powder or grains, products for preparing broths, soups, beverages and infusions of various kinds: such list shall be intended as an example and without limitation.

FIGS. 1A to 1C show various views of the capsule 1 which comprises:
a container body 2, which is susceptible of having the shape of a small tray or cup, and defines a volume 21 for housing the soluble or extractable product,
a lower base 3,
an upper base 5 and
a side wall 4 which extends in a longitudinal direction X-X between the lower base 3 and the upper base 5.

It shall be noted that the container body 2 of the capsule 1 is preferably made of a compostable or biodegradable material, the term "biodegradable" being intended to designate the ability of organic substances and materials to be degraded to simpler molecules through a series of irreversible chemical reactions. The level of biodegradation required for a material to be certified as biodegradable is at least 90% to be reached in no more than 6 months.

Preferably, the container body 2 of the capsule 1 is made of biodegradable materials selected from the group comprising corn starch, potato starch and cellulose, biodegradable and compostable plastics known under the trade name of Mater-Bi and/or any combination of these materials.

In particular, the container body 2 of the capsule 1 is preferably formed with a compostable material, e.g. a compostable cast material based on polyesters/PLA/starch resins and the like.

In various embodiments, as well as represented in the accompanying figures, the container body 2 may have the shape of a tray that diverges from the lower base 3 toward the upper base 5. In various embodiments, the diverging shape may be a frustoconical shape. Nevertheless, this shape is not mandatory, as the capsule 1 may have different shapes as a whole, e.g. prismatic, frustopyramidal, square, etc.

In various embodiments the lower base 3 has:
an inner surface 300, facing the volume 21 and
an outer surface 301 facing the outside of the capsule.

The lower base 3 comprises openings 302 for the passage of an extraction fluid from the outer surface 301 to the inner surface 300 of the lower base 3.

As shown in FIG. 2, the capsule 1 comprises a first compostable barrier lid 50 and a second compostable barrier lid 30.

The first compostable barrier lid 50 is sealably associated with the upper base 5, i.e. forms a hermetic closure therewith.

In a preferred embodiment, the upper base 5 defines an annular edge 501 and the first compostable barrier lid 50 is sealably associated with the annular edge 501 via a sealing region 503.

This advantageously ensures preservation of the organoleptic properties of the product contained in the capsule 1, since the first compostable barrier lid 50 is an oxygen and moisture barrier lid.

It shall be noted that the sealing region 503 is preferably obtained by means of by heat sealing or other known techniques, such as ultrasound or adhesive materials.

The first compostable barrier lid 50 also advantageously exhibits such penetrability/frangibility and/or thickness as to be opened under the pressure of the extraction liquid.

In one aspect, the first compostable barrier lid 50 has no cut, i.e. no weakening region but is still designed to contact the mechanism of the apparatus that provides the pressurized extraction fluid, according to known techniques, that will not be described herein.

The second compostable barrier lid 30 is sealably associated with the inner surface 300 of the lower base 3 via a sealing region 303.

As shown in FIG. 4, the second compostable barrier lid 30 preferably comprises a peripheral portion, which extends beyond the openings 302 of the lower base 3 and is adapted to hermetically seal such openings 302 (i.e., with no air and/or gas being able to flow therethrough).

Preferably, this second compostable barrier lid 30 is designed as a seamless material, with no discontinuity both in its surface realization and in its thickness.

The second compostable barrier lid 30 preferably identifies a first surface 30a, facing the inner surface 300 of the lower base 3, and a second surface 30b, facing the volume 21 for housing the soluble or extractable product.

It shall be noted that the second compostable barrier lid 30 is placed within the volume 21 and directly contacts the soluble or extractable products.

Figure 5B:
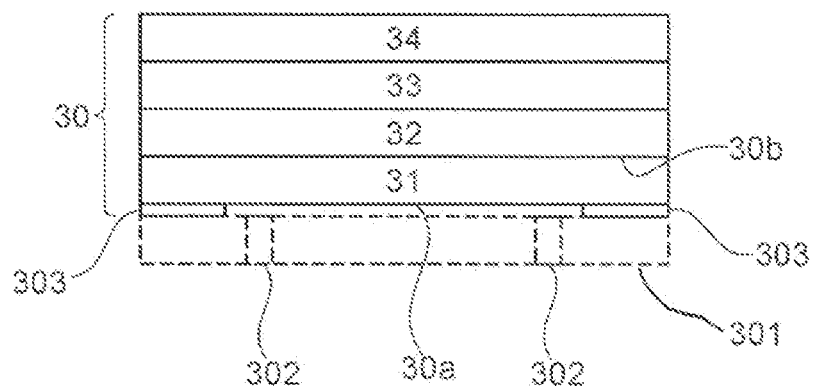

The lower base 3 is hermetically sealed by the second compostable barrier lid 30 such second compostable barrier lid 30 being associated with the inner surface 300 of the lower base 3 via a sealing region 303 as shown in FIG. 5B.

It shall be noted that the sealing region 303 is preferably obtained by means of heat sealing or other known techniques, such as ultrasound or adhesive materials.

Namely, the openings 302 in the lower base 3 are closed by the second compostable barrier lid 30.

This advantageously ensures preservation of the organoleptic properties of the product contained in the capsule 1, since the second compostable barrier lid 30 is an oxygen and moisture barrier lid.

In a particular aspect, the sealing region 303, in operation, is designed to yield at least in a portion thereof under the pressure of the extraction fluid flowing through said openings 302.

In other words, the tips that are typically provided to pierce the lid, do not touch the second compostable barrier lid 30 according the present disclosure, and the lid allows water to flow into the volume 21 of the cartridge because the sealing region 303 yields under the hydraulic pressure exerted by the water.

Advantageously, a capsule 1 is provided in which the second compostable barrier lid 30 is designed to operate in a dispensing machine having tips for tearing the capsule as the unit is mechanically closed for water to flow into the capsule through the opening 302 with such tips not tearing the second compostable barrier lid 30.

In one aspect, the second compostable barrier lid 30 is composed of a seamless material, which remains intact under the pressure exerted by the extraction fluid flowing through said openings 302.

In particular, the second compostable barrier lid 30, in addition to not being pierced by the tips, is not torn and/or does not retract under the action of the pressure of the extraction fluid, which means that the second compostable barrier lid 30 maintains its integrity as the sealing region 303 yields under the pressure of the extraction fluid.

It shall be noted that the pressure of the extraction fluid through the openings 302 causes the second compostable barrier lid 30 to be raised relative to the inner surface 300 of the lower base 3, which means that its first surface 30a moves apart from the inner surface 300 of the lower base 3.

In other words, the average tension of the second compostable barrier lid 30 is higher than that of the portion of the sealing region 303 which yields under hydraulic pressure.

In one aspect, the sealing region 303 that yields is only a portion of the entire sealing region 303. This is because when a portion of the sealing region 303 yields, then the water that flows through the gap created between the second compostable barrier lid 30 and the sealing region 303 that has yielded decreases its pressure while leaving unchanged the rest of the sealing region 303 that has not yielded.

Namely, the pressure of the extraction fluid that causes the sealing region 303 to be detached from the second side of the annular portion 3011 of the lower base 3, for at least a portion of the peripheral region of the second compostable barrier lid 30, ranges from 0.5 bar to 15 bar. As would be understood by a person having ordinary skill in the art ("PHOSITA"), this pressure corresponds to the peel strength per unit area of the sealing region.

In one aspect, as shown by FIGS. 2 and 4, the lower base 3 may have a sculptured structure, i.e. with the respective raised and recessed areas. In various embodiments, as shown in FIGS. 2 and 4, this sculptured structure causes the capsule 1 (i.e., when viewed from the outer side relative to the viewpoint of FIGS. 2 and 4), to not have a flat lower base 3.

Preferably, the annular portion 3011 is configured to be recessed relative to said central portion 3010 and the openings 302 are provided in said annular portion 3011.

In particular, the annular portion 3011 defines a first side facing out of the capsule, and a second side facing the volume 21 for housing the soluble or extractable product, and the tips fit into the recessed region that faces out of the capsule, without contacting the second compostable barrier lid 30.

In this preferred embodiment, the sealing region 303 of the second compostable barrier lid 30 is located on the second side of the annular portion 3011 that faces the volume 21.

More preferably, the sealing region 303 is interposed between said second side of the annular portion 3011 and said peripheral portion of said second compostable barrier lid 30 that extends beyond the openings 302.

This sealing region 303 is embodied by a circular crown.

The aforementioned annular portion 3011 is preferably connected, on one side, to the side wall 4 of the capsule 1 and, on the other side, to said central portion 3010.

In a preferred embodiment, the openings 302 of the lower base 3 may have any shape and define an overall opening surface that ranges from 1 $mm^2$ to 8 $mm^2$, and is preferably 4 $mm^2$.

In a preferred embodiment, the openings 302 comprise a plurality of distinct openings between each other and arranged along a circumference 3020 (FIG. 1C). Particularly, the plurality of openings 302 preferably comprises eight openings, having a circular section with a diameter ranging from 0.5 mm to 1.1 mm.

The structure and advantages of the first and second compostable barrier lids 50, 30 and 50 will be now described with reference to FIGS. 5A and 5B.

It shall be noted that, as used herein, the term "lid" is intended to designate a closure element for the container body of a capsule, which is designed to contain the soluble or extractable product in the container body of the capsule and to impede the ingress of liquid and solid foreign agents into the container body of the capsule.

As used herein, the term "barrier lid" is intended to designate a closure element that has physical or chemical resistance features (i.e., oxygen-, water-, gas-, or flavor-resistance properties, or a combination thereof).

The term "compostable barrier lid" is intended to designate a closure member which, in addition to the above-mentioned characteristics, also meets the compostability requirements of the standards in force.

As used hereinbelow, the term "outer layer" is intended to designate the lid surface that faces the outside or the surrounding environment, whereas the term "inner layer" is intended as the surface of the lid surface that, in operation, faces the volume enclosed by a capsule or by a container (i.e., the surface of the membrane opposite to the one that faces the outside environment).

The second compostable barrier lid 30 comprises at least one first barrier layer 31 which contains a compostable barrier film and an oxygen barrier layer 32.

Preferably, the second compostable barrier lid 30 has a predetermined thickness, which ranges from the smallest thickness that can be obtained with the relevant technology to a maximum of 200 µm.

The elastic modulus of the second compostable barrier lid 30 ranges from 100 to 5000 MPa.

The first compostable barrier lid 50 comprises at least one first barrier layer 51 which contains a compostable barrier film and an oxygen barrier layer 52.

In a particular aspect, the first compostable barrier lid 50 has a thickness S that ranges from 40 to 200 µm.

The embodiments of the first and of the second compostable barrier lids 50, 30 as described below advantageously provide oxygen barrier values of less than 10 cc m$^2$/day atm at 0% relative humidity (RH), at 23° C.

1$^{st}$ Embodiment

In a first embodiment, the first and second compostable barrier lids 50, 30 respectively comprise:
a first barrier layer 51, 31 containing a compostable barrier film;
an oxygen barrier layer 52, 32.

In one aspect, the first barrier layer 51, 31 contains a compostable oriented barrier film.

The term "oriented film" is intended to designate a polymeric film whose polymer chains are extended and oriented in one or more common directions.

The preferred compostable barrier oriented film is cellophane, which advantageously exhibits compostability and oxygen-resistance properties.

The oxygen barrier layer 52, 32 advantageously increases the oxygen resistance of the first barrier layer 51, 31 and creates a moisture barrier.

Preferably, the oxygen barrier layer 52, 32 comprises a metallization layer.

Metallization can be carried out using well-known techniques, in which, as a rule, the metal selected for deposition is suitably heated and later sprayed on the surface of interest.

Preferably, the metal that is used for the realization of the metallization layer is aluminum.

More preferably, such aluminum layer has a thickness that ranges from 200 Å to 500 Å.

Alternatively, the metallization layer is formed by depositing SiOx and AlOx oxides.

The oxygen barrier layer 52, 32 and the first barrier layer 51, 31, are separated by an intermediate layer 53, 33 containing at least one adhesive, where said at least one adhesive is preferably selected from compostable or non-biocompostable adhesives.

The weight contribution of said intermediate layer 53, 33 is such as to ensure that, even when at least one non-compostable adhesive is contained, the first and second compostable barrier lids 50, 30 meet the requirements of biocompostability.

The intermediate layer 53, 33 preferably comprises at least one adhesive selected from at least one of the following polyurethane adhesives; one-, two- or multi-component adhesives; adhesives comprising blocked isocyanates (i.e. isocyanate groups with a protected reactive group that may be removed at high cross-linking temperatures), pressure-sensitive adhesives (PSA).

Non-limiting examples of PSA adhesives are, for example, acrylate polymers, butyl, ethylene-vinyl acetate (EVA) rubber with high vinyl acetate content, natural rubber, nitryls, silicone rubbers, which require special "MQ" silicate resin tackifying agents, a monofunctional ("M") trimethyl silane compound reacted with quadrifunctional ("Q") silicon tetrachloride, styrene block copolymers (SBC), also known as styrene copolymer adhesives and rubber-based adhesives, styrene-butadiene-styrene (SBS), styrene-ethylene/butylene-styrene (SEBS), styrene-ethylene/propylene (SEP), styrene-isoprene-styrene (SIS), vinyl ethers and mixtures thereof.

Preferably, the intermediate layer 53, 33 of said first and second compostable barrier lids 30 comprises a polyurethane adhesive, preferably a multi-component polyurethane adhesive.

More preferably, the multi-component polyurethane adhesive comprises an isocyanate component. It shall be noted that the isocyanate component may be, for example, of aromatic, aliphatic or cycloaliphatic type and may have an average functionality equal or greater than 2.

By way of illustration and without limitation, said isocyanate may comprise, for example, at least one of toluene diisocyanate (TDI), methylene diphenyl diisocyanate (MDI), phenylene diisocyanate, xilylene diisocyanate, diphenyl methane diisocyanate, polyphenylmethane polyisocyanate (polymeric MDI), naphthalene diisocyanate, triphenylmethane triisocyanate, diphenyl sulfone diisocyanate, cyclohexane diisocyanate, ethylene diisocyanate, propylene diisocyanate, tetramethylene diisocyanate, examethylene diisocyanate, isophorone diisocyanate (IPDI), dimers and trimers of these diisocyanates or mixtures thereof.

In a preferred embodiment, the polyurethane adhesive further comprises a plasticizer.

For the purposes of the present invention, the polyurethane adhesive is preferably a solvent-free, solvent-based or water-based adhesive.

It shall be noted that, in an alternative embodiment, the polyurethane adhesive preferably comprises at least any one of a conventional commercially available catalyst, an inorganic filler, a dye, an antioxidant, a UV light absorber, an adhesion promoter, a calcium oxide, included expandable microspheres (e.g. known under the trade name EXPANCEL®), drying agents, or mixtures thereof. According to an alternative embodiment, the polyurethane adhesive preferably comprises at least any one of the conventional commercially available organic fillers, chain extenders, UV stabilizers, light stabilizers, fungicides, biocides, antimold agents, flame retardants, surface additives, solvents, mineral oils, dispersing agents, antifoaming agents, storage stabilizers, latent curing agents, cure retarders, antifoaming agents, solvents, or mixtures thereof.

2$^{nd}$ Embodiment

In a second embodiment, each of the first and second compostable barrier lids 50, 30 respectively comprises:
a first barrier layer 51, 31 containing a compostable barrier film;
an oxygen barrier layer 52, 32;
an intermediate layer 53, 33 containing at least one adhesive; and
a second barrier layer 54, 34 containing a compostable barrier film.

In this embodiment, in addition to what has been already described concerning the $1^{st}$ embodiment, the first barrier layer 51, 31 constitutes the outer layer and the second barrier layer 54, 34 constitutes the inner layer of each first compostable barrier lid 50 and second compostable barrier lid 30. In the case of the second compostable barrier lid 30, the first barrier layer 31 is considered the outer layer as it faces out of the capsule.

In one aspect both the first barrier layer 51, 31 and the second barrier layer 54, 34 contain a compostable oriented barrier film, consisting of cellophane, which advantageously exhibits compostability and oxygen-resistance properties.

The Applicant found that the first compostable barrier lid 50, when formed according to the second embodiment, in view of ensuring proper function of the capsule 1, has an elastic modulus, i.e. a puncture resistance, preferably ranging from 15 to 30 N, as measured according to ASTM F 1306.

It shall be noted that in this second embodiment, each of said first and second compostable barrier lids 50, 30 preferably comprises an additional oxygen barrier layer disposed between the intermediate layer 53, 33 and the second barrier layer 54, 34.

Such additional oxygen barrier layer preferably comprises a metallization layer, which advantageously increases the oxygen resistance of the second barrier layer 54, 34 and creates a moisture barrier.

Preferably, the metal that is used to form the additional oxygen barrier layer is aluminum.

More preferably, such additional aluminum layer has a thickness that ranges from 200 Å to 500 Å.

Alternatively, the metallization layer of the additional oxygen barrier layer is formed by depositing SiOx and AlOx oxides.

Preferably, each of said first and second compostable barrier lids 50, 30 of the invention comprises an additional outer layer adjacent to the first barrier layer 51, 31 on a side opposite to the side coupled to the oxygen barrier layer 52, 32, comprising a heat-resistant lacquer.

Suitable materials for the heat-resistant lacquer include, for example, lacquers based on chlorovinyl resin, polyurethane resin, nitro-polyurethane resin, nitro-acrylic resin; nitrocellulose resin; polyester resin; cellulose; acrylic resin; styrene resin; acrylic-styrene resin; epoxy resin; alkyd resin; melamine resin; siloxane resins; urethane resins; urea resins.

It shall be noted that the first compostable barrier lid 50 comprises a filter 55, adjacent to the second barrier layer 54, on a side opposite to the one that is coupled with the intermediate layer 53 comprising the adhesive.

Preferably said filter 55 is made of a nonwoven fabric (TNT), e.g. a polylactic acid (PLA) nonwoven fabric.

The filter 55 may be combined or not combined with the compostable multilayer membrane.

If the filter 55 is combined, it is preferably bonded to the membrane by well-known techniques such as by heat sealing, gluing, spot (aligned) gluing and the like, where gluing is preferably carried out by means of compostable or non-compostable adhesives.

It shall be noted that, according to an alternative embodiment, the first compostable barrier lid 50 comprises a thermoplastic film made of polylactic acid (PLA). Preferably, such thermoplastic polylactic acid film is placed adjacent to the second barrier layer 54, particularly on a side opposite to the side that is coupled to the intermediate layer 53, the latter comprising the adhesive.

Unlike a TNT filter, the thermoplastic PLA film advantageously provides good flavor and oxygen barrier properties and poor steam barrier properties.

If the first compostable barrier lid 50 comprises a thermoplastic PLA film, it is preferably bonded to the second barrier layer 54 by means of a layer comprising a compostable or non-compostable adhesive.

In a more preferred embodiment of the first embodiment, one or both of said oxygen barrier layer 52, 32 and the additional oxygen barrier layer of the first compostable barrier lid 50 and of the second compostable barrier lid 30 comprise a layer that contains a lacquer having oxygen barrier properties (oxygen barrier).

The oxygen-barrier lacquer is preferably selected from at least one of the following: lacquers based on PVDC; based on polyvinyl alcohol resin as such or modified with silanes; based on cellulose; based on acrylic resin; based on epoxy resin.

Preferably, one or both of said oxygen barrier layer 52, 32 and the additional oxygen barrier layers of the first and second compostable barrier lids 50, 30 respectively comprise a layer that contains said oxygen barrier lacquer, coupled to a metallization layer by a primer selected, for example, from polyurethane, isocyanate, isocellulose, or the like.

$3^{rd}$ Embodiment

In a third embodiment of the first and second compostable barrier lids 50, 30, the first and second compostable barrier lids 50, 30 comprise a first barrier layer 51, 31 and a second barrier layer 54, 34 containing a compostable non-oriented barrier film.

It shall be noted that the above considerations concerning the previous embodiments are also applicable to the third embodiment of each of said first compostable barrier lid 50 and second compostable barrier lid 30.

Namely, according to said third embodiment, the first compostable barrier lid 50 has an elastic modulus that ranges from 3 to 20 N, as measured according to ASTM F 1306 and a thickness S that ranges from 40 to 200 μm.

Said compostable non-oriented film is, for example, a polymeric film formed by the cast technology, based on polyesters, polylatic acid, starch resins or the like.

Advantageously said compostable non-oriented film has remarkable fragility features.

A polymeric film is deemed to be non-oriented when the polymeric chains are in a random coil configuration and at least one common direction of orientation cannot be identified. Generally, non-oriented polymeric films are amorphous polymeric films.

The oxygen barrier layer 52, 32 advantageously increases the oxygen imperviousness of the first barrier layer 51, 31 and creates a moisture barrier.

Preferably, the oxygen barrier layer 52, 32 comprises a metallization layer.

Metallization can be carried out using well-known techniques, in which, as a rule, the metal selected for deposition is suitably heated and later sprayed on the surface of interest.

Preferably, the metal that is used for the realization of the metallization layer is aluminum. More preferably, such aluminum layer has a thickness that ranges from 200 Å to 500 Å.

Alternatively, the metallization layer is formed by depositing SiOx and AlOx oxides.

In each of said first and second compostable barrier lids 50, 30, the oxygen barrier layer 52, 32 is separated from the second barrier layer 54, 34 by an intermediate layer 53, 33 containing at least one adhesive, where said at least one adhesive is preferably selected from compostable or non-compostable adhesives.

The weight contribution of said intermediate layer 53, 33 is such as to ensure that, even when at least one non-compostable adhesive is contained, the entire multilayer membrane meets the requirements of biocompostability.

The intermediate layer 53, 33 preferably comprises a polyurethane adhesive which, for the purposes of the present invention, may be a one- or two-component adhesive and is preferably a solvent-free, solvent-based or water-based adhesive.

In an alternative embodiment, each of the first compostable barrier lid 50 and the second compostable barrier lid 30 comprises an additional oxygen barrier layer disposed between the intermediate layer 53, 33 and the second barrier layer 54, 34.

It shall be noted that, in an alternative embodiment, each of said first and second compostable barrier lids 50, 30 comprises an outer layer adjacent to the first barrier layer 51, 31 on a side opposite to the side upon which the oxygen barrier layer 52, 32 has been deposited, comprising a heat-resistant lacquer.

Suitable materials for the heat-resistant lacquer include, for example, lacquers based on chlorovinyl resin, based on polyurethane resin, based on nitro-polyurethane resin, based on nitro-acrylic resin; based on nitrocellulose resin; based on polyester resin; based on cellulose; based on acrylic resin; based on styrene resin; based on acrylic-styrene resin; based on epoxy resin; based on alkyd resin; based on melamine resin; based on siloxane resins; based on urethane resins; based on urea resins.

It shall be noted that, according to a more preferred embodiment, the first compostable barrier lid 50 comprises a filter 55, adjacent to the second barrier layer 54, on a side opposite to the one that is coupled with the intermediate layer 53 comprising the adhesive.

Preferably said filter 55 is made of a nonwoven fabric (TNT), e.g. a polylactic acid (PLA) nonwoven fabric.

The filter 55 may be combined or not combined with the first compostable barrier lid 50.

If the filter 55 is combined, it is preferably bonded to the first compostable barrier lid 50 by well-known techniques such as by heat sealing, gluing, spot (aligned) gluing and the like, where gluing is preferably carried out by means of compostable or non-compostable adhesives.

It shall be noted that, according to an alternative embodiment, the first compostable barrier lid 50 comprises a thermoplastic film made of polylactic acid (PLA) adjacent to the second barrier layer 54, on a side opposite to the one that is coupled with the intermediate layer 53 comprising the adhesive.

If the first compostable barrier lid 50 comprises a thermoplastic PLA film, it is preferably bonded to the second barrier layer 54 by means of a layer comprising a compostable or non-compostable adhesive.

Preferably, one or both of said oxygen barrier layer 52, 32 and oxygen barrier layers of the first compostable barrier lid 50 and the second compostable barrier lid 30 respectively comprise a layer that contains a lacquer having oxygen barrier properties (oxygen-barrier).

The oxygen-barrier lacquer is preferably selected from at least one of the following: lacquers based on PVDC; based on polyvinyl alcohol resin as such or modified with silanes; based on cellulose; based on acrylic resin; based on epoxy resin.

Preferably, one or both of said oxygen barrier layer 52, 32 and oxygen barrier layer comprise a layer that contains said oxygen-barrier lacquer, coupled to a metallization layer by a primer selected, for example, from polyurethane, isocyanate, isocellulose or the like.

4$^{th}$ Embodiment

In a fourth embodiment, each of the first compostable barrier lid 50 and the second compostable barrier lid 30 comprises a first barrier layer 51, 31 containing a compostable non-oriented barrier film and a second barrier layer 54, 34 containing a compostable oriented barrier film.

It shall be noted that the above considerations concerning the preceding embodiments also apply to the fourth embodiment.

Here, the first compostable barrier lid 50 has an elastic modulus that preferably ranges from 9 to 16 N, as measured according to ASTM F 1306.

Those skilled in the art will obviously appreciate that a number of changes and variants as described above may be made to fulfill particular requirements, without departure from the scope of the invention, as defined in the following claims.

The invention claimed is:

1. A capsule, comprising:
   a container body that defines a volume configured to house a soluble or extractable product;
   a first compostable barrier lid; and
   a second compostable barrier lid;
   wherein the container body comprises a lower base, an upper base, and a side wall extending in a longitudinal direction between the lower base and the upper base,
   wherein the lower base comprises:
      an inner surface, facing toward the volume configured to house the soluble or extractable product; and
      an outer surface, facing out of the capsule;
   wherein openings of the lower base are configured to allow passage of pressurized extraction fluid from the outer surface to the inner surface,
   wherein the first compostable barrier lid is sealed to the upper base,
   wherein the second compostable barrier lid is a barrier against oxygen and moisture,
   wherein the second compostable barrier lid is sealed to the inner surface of the lower base by heat sealing, ultrasound, or adhesive material at a first sealing region,
   wherein the second compostable barrier lid is configured to close the openings of the lower base, and
   wherein the first sealing region is configured to detach from the inner surface of the lower base, for at least a portion of a peripheral region of the second compostable barrier lid, when a pressure of the pressurized extraction fluid is greater than or equal to 0.5 bar and less than or equal to 15 bar.

2. The capsule of claim 1, wherein the second compostable barrier lid is further configured to remain intact under the pressure of the pressurized extraction fluid.

3. The capsule of claim 1, wherein the second compostable barrier lid has a predetermined thickness and defines a first surface facing the inner surface of the lower base and a second surface facing the volume of the capsule, and
   wherein the second compostable barrier lid comprises at least one barrier film containing a compostable barrier layer and an oxygen barrier layer.

4. The capsule of claim 1, wherein the lower base, when viewed from outside of the container body, further comprises:
- a central portion; and
- an annular portion surrounding the central portion;
- wherein the annular portion is recessed relative to the central portion, and
- wherein the openings of the lower base are provided in the annular portion.

5. The capsule of claim 4, wherein the annular portion has a first side, facing out of the capsule, and a second side, facing the volume of the capsule, and
- wherein the first sealing region is provided at the second side.

6. The capsule of claim 5, wherein the first sealing region is interposed between the second side of the annular portion and the peripheral portion of the second compostable barrier lid which extends beyond the openings of the lower base.

7. The capsule of claim 4, wherein the annular portion is connected on a first side with the side wall and on a second side with the central portion.

8. The capsule of claim 1, wherein the openings of the lower base define an overall opening surface area, when combined, greater than or equal to 1 square millimeter ($mm^2$) and less than or equal to 8 $mm^2$.

9. The capsule of claim 8, wherein the openings of the lower base are eight in number, and
- wherein each of the openings of the lower base has a circular section with a diameter greater than or equal to 0.5 millimeters (mm) and less than or equal to 1.1 mm.

10. The capsule of claim 1, wherein the upper base defines an annular edge, and
- wherein the first compostable barrier lid is sealed to the annular edge at a second sealing region.

11. The capsule of claim 10, wherein the first compostable barrier lid is sealed to the upper base by heat sealing, ultrasound, or adhesive material at the second sealing region.

12. The capsule of claim 1, wherein the first compostable barrier lid comprises at least one first barrier layer and at least one oxygen barrier layer.

13. The capsule of claim 1, wherein the container body is made of compostable material.

14. The capsule of claim 1, wherein the openings of the lower base define an overall opening surface area, when combined, equal to 4 square millimeters ($mm^2$).

15. The capsule of claim 1, wherein the openings of the lower base are eight in number.

16. The capsule of claim 1, wherein the openings of the lower base have a circular section.

17. The capsule of claim 1, wherein a thickness of the first compostable barrier lid is greater than or equal to 40 microns (μm) and less than or equal to 200 μm.

18. The capsule of claim 1, wherein a thickness of the second compostable barrier lid is less than or equal to 200 microns (μm).

19. The capsule of claim 1, wherein the first compostable barrier lid comprises a compostable oriented barrier film.

20. The capsule of claim 1, wherein the first compostable barrier lid comprises a compostable non-oriented barrier film.

* * * * *